United States Patent [19]
Mauduit

[11] Patent Number: 5,396,699
[45] Date of Patent: Mar. 14, 1995

[54] METHOD FOR INCORPORATING A HEATING ELEMENT IN A COMPOSITE STRUCTURE

[75] Inventor: Daniel Mauduit, Frejus, France

[73] Assignee: Aerospatiale Sociéte Nationale Industrielle, Paris, France

[21] Appl. No.: 991,247

[22] Filed: Dec. 16, 1992

[30] Foreign Application Priority Data

Dec. 19, 1991 [FR] France ................... 91 15785

[51] Int. Cl.⁶ ........................................ H05B 3/00
[52] U.S. Cl. ...................... 29/611; 219/543; 156/187; 156/194; 156/245
[58] Field of Search ................ 29/611; 219/543; 156/171, 185, 187, 191, 194, 245

[56] References Cited

U.S. PATENT DOCUMENTS

| | | | |
|---|---|---|---|
| 4,214,932 | 7/1980 | Van Auken | 156/187 |
| 4,287,663 | 9/1981 | Newbold, Jr. | |
| 5,068,517 | 11/1991 | Tsuyuki et al. | 219/543 |

FOREIGN PATENT DOCUMENTS

| | | |
|---|---|---|
| 1230668 | 9/1960 | France . |
| 0141700 | 5/1985 | France . |
| 2637534 | 4/1990 | France . |
| 4097839 | 3/1992 | Japan ................... 156/185 |

Primary Examiner—P. W. Echols
Attorney, Agent, or Firm—Nikaido, Marmelstein, Murray & Oram

[57] ABSTRACT

A novel method of forming a heating element in a proper place on the surface of a composite, molded material made up of a multiplicity of layers of individual element where the elements are overlapped each other, suitably on a mandrel, until the composite article almost completely built up; the last element has a plastic strip disposed on the surface thereof which will be the outermost surface of the molded article, and on the surface of this plastic strip, which is directed away from the rest of the composite article, there is disposed at least one printed resistance circuit in such position(s) as to provide heating coverage for so much of the surface of the composite article as is required. This composite article is then molded, suitably by compression, to form the desired final article with the heating circuit on an exposed surface. If desired, suitable electric cables can be attached to the heating circuit. In the final product, the heating circuit does not extend above the surface of the composite article to any appreciable extent, if at all.

5 Claims, 1 Drawing Sheet

METHOD FOR INCORPORATING A HEATING ELEMENT IN A COMPOSITE STRUCTURE

FIELD OF THE INVENTION

The invention concerns structures made of composite materials obtained via the assembling of elementary parts which has extremely good dimensional stability. These composite materials are used in particular for making satellites. More specifically the invention concerns a method to incorporate in these composite material structures heating elements intended to ensure their thermic control.

BACKGROUND OF THE INVENTION

In the technical field constituted by the production of satellite structures made of composite materials, it is essential to provide strict thermic control of the elements constituting the structure by equipping them with both cooling units and heaters distributed at appropriate locations on the assembly. In fact, it is known that, depending on their position in sunlight or in shade, the various parts of a satellite are subjected to extremely wide temperature variations which, despite the choice of appropriate materials, may result in spacial deformations which, even if minimal, may render inoperative observation and communication transmission devices. One known solution consists of gluing to the appropriate elements of the structure a heater mainly consisting of a heating resistor, such as a printed circuit mounted on a plastic strip. This technique can be combined with another known technique and used in aeronautics so as to ensure the deicing of the fuselage or wings of an aircraft. This other technique consists of placing a composite structure with current conducting fibers at the critical zones to be de-iced, as described in the document FR-A 2 356 336. The feeding of electric current needing to traverse the fibers is effected via the connection of wires to a metallic frame mounted at the edge of the critical zones which is kept in contact with the fibers, or to a metallic deposit which is produced by vaporization or electrolytic means at the extremities of the critical zones containing the fibers. Apart from the drawback of being complex to mount and dispose, these devices have one major defect as regards the electric contacts required between the fibers and the feed wires owing to the fragility of gluings of the electric link. Moreover, the excess thicknesses existing at the locations of the electric connections are detrimental to the aerodynamic profile of the wings and impede the correct placing of structures for shielding and protecting the leading edges against impacts and erosion.

By virtue of the document FR-A 2 578 377 in the name of the Applicant, there exists a de-icing device able to avoid these drawbacks, a device in which the conductive fibers are carbon fiber appearing in the form of at least one strip in which the fibers are orientated longitudinally, the strip being preimpregnated with resin and having at least one extremity being fixed in the shape of a deformable tubular element with a metallic meshwork ensuring the required electric link via contact with said strip and by welding or crimping such to the corresponding feed wire.

However, as regards the embodiment of elementary parts made of a composite material and intended to form the load bearing structure of a satellite which are needing to be equipped with a heater, it seems impossible to add a strip and tubular element such as is shown in the prior art to each part.

The document FR-A 2 339 314 also describes conductive heating very thin layers incorporating conductors parallel to the direction of the orientation of these layers. The documents FR-A 2 233 487 or FR-A 1 533 941 describe motor vehicles with heated windows or laminated panels equipped with incorporated resistance wires, but these production techniques clearly prove to be totally unsuitable for employment in a satellite load bearing structure.

At the current moment, the adding of a heater to a composite support requires the prior cleaning of said support at the same time as the preparation of the surface quality of the heater, followed by masking of the support receiving the heater and then spreading a coating of glue on the assembled elements. Finally, after polymerization of the glue, the gluing zones need to be demasked and cleaned before fixing the connection cables, for example with the aid of collars. This gluing needs to be effectedly fully and evenly, firstly to ensure a correct regular thermic contact with the support, and secondly so as to avoid the risks of tearing or hooking of the corners of the heater during its various handlings and avoid leaving any air bubbles caught under the heater and which would burst in space!

This production technique does nevertheless have a certain number of drawbacks. In addition, it requires the passage of each elementary part through at least two workshops or production zones, namely firstly to make the basic part according to either of the known methods, namely via filamentary winding, draping of strips, etc., and then of adding to it the heating element. These operations not covered by each of these techniques and dealt with by the same specialists are thus effected one after the other and thus they double the production time and risks of pollution, and thus require that constricting precautions be taken as regards cleanness.

SUMMARY OF THE INVENTION

Anxious to avoid these drawbacks, the Applicant has thus been able to create a method able to reduce the product production cycle period and the cost of production, whilst increasing the reliability of the product. More particularly a method has been developed allowing for more flexibility in the design logic of the thermic control of the satellite by virtue of a standardization of the useable heating elements and greater flexibility in the production of the structures required.

One main object of the present invention thus consists of a method for incorporating a heating element in the surface of a composite structure formed of an assemblage of elementary parts. Each such composite article has at least one heater disposed on a surface thereof. The method consists of laying a series of overlapping strips on a mandrel; providing on the outermost strip, at least one plastic strip on which a printed circuit has firstly been mounted, which circuit forms the resistor of the heater so that on molding said plastic strip is located on the outside surface of the elementary part and is integrated in the final outermost strip without forming any projection from the surface thereof which is thicker than the printing of the printed circuit.

According to one preferred characteristic of the invention, a plurality of heaters disposed alternatively (such as in zig-zag position) is laid on the outermost strip so as to cover the entire peripheral surface of the finished part. Electric feeder cables are welded to the heating strips of the finished elementary parts.

BRIEF DESCRIPTION OF THE DRAWINGS

Other characteristics and advantages of the invention shall appear from the following description of one embodiment with reference to the accompanying drawings on which.

DETAILED DESCRIPTION OF THE PREFERRED EMBODIMENTS

Figure 1:
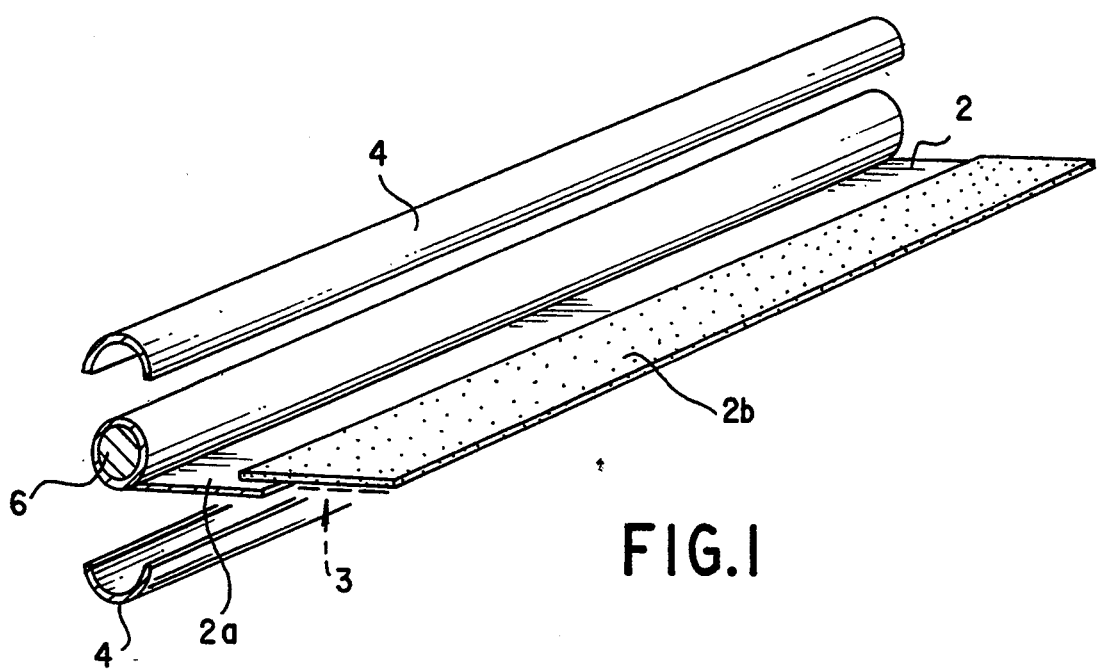
FIG. 1 is a diagrammatic perspective view of the draping of strips on a mandrel.

FIG. 1 shows a mandrel 6 on which are successively disposed prefabricated composite strips 2, with the successive strips overlapping longitudinally. The figure shows one front final strip 2a and one final strip 2b before they are wound on the strips which have previously been stacked on the mandrel. Each strip is impregnated with resin forming the bonding material for the composite product.

The method consists of disposing on a surface of the final outermost strip 2b a heater 3 which is suitably in the form of a plastic strip on which there has been mounted a printed circuit which forms the heating resistor circuit of the heater. The heater 3, denoted on FIG. 1 by a dotted line, is thus placed. When the final strip 2b has been draped on the other strips on the mandrel, the heating strip will then be located on an outside surface of the composite part on which it has been mounted. The mounting and assembly of these strips is by virtue of a resin coating forming the bonding material. The next operation consists of closing the two shells of a mold 4 about the assembled strips on the mandrel. During this molding stage, the heating strip 3 is integrated into the final layer of the strip 2 without forming any projection thicker than the printing comprising the resistor.

Figure 2:
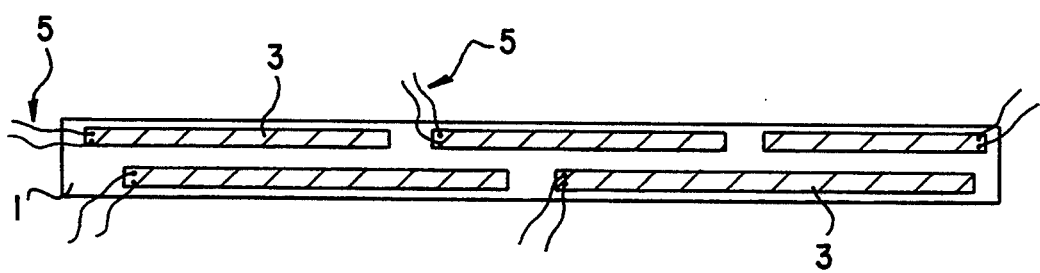
FIG. 2 is a front view of an elementary part equipped with printed circuit heating elements according to this invention.

FIG. 2 shows a plurality of heating strips 3 disposed in an alternating pattern, for example, on the same elementary part 1 so that on the finished part, the entire peripheral surface is regularly fitted with a heater.

According to requirements, electric feeding cables 5 are conventionally welded onto these finished elementary parts.

The cables 5 welded to the composite element may be additionally spread with glue so as to ensure the mechanical stability of the cables. Force applied to the cable will therefore not damage the behavior of the heater on the composite element. The cables are advantageously secured to the composite elements by collars (not shown).

Each element of the structure can thus be heated in a few minutes without deterioration with a power level of about between 0.25 and 0.5 W, for example. There is an excellent thermic joint between the heater and the element since the heater is embedded in its final outermost layer.

The invention is not merely limited to the technical field described above and could be applied in all activity sectors requiring a thermic control of composite elements obtained by moulding and operating such molded composite elements in a particularly cold environment.

What is claimed is:

1. Method of incorporating a heating element on a surface of a molded structure, which structure comprises a succession of individual elements at least partially overlappingly assembled on each other and molded together;

which method comprises:
   mounting at least one printed circuit, comprising a resistor for a heater circuit, on a surface of a plastic strip;
   at least partially overlappingly assembling said elements into the form of said molded structure to form a preliminary assemblage;
   disposing said plastic strip on said preliminary assemblage of elements, such that the surface of said plastic strip containing said printed circuit is exposed, to form a final assemblage; and
   molding said final assemblage together such that said printed circuit remains exposed on the surface of the molded product thereof but does not substantially project from said surface.

2. Method according to claim 1, wherein a plurality of heaters disposed zig-zag is laid on an elementary part on the final strip so as to substantially effectively cover the entire peripheral surface of the finished part.

3. Method according to claim 1, wherein electric feeding cables are welded to said printed circuit of the finished elements.

4. Method according to claim 3, wherein cables are additionally spread with glue.

5. In the method of making a molded article comprising a multiplicity of successive layers and having a heating element mounted thereon by superposing successive layers, including an outermost layer, of moldable material on a mandrel and on each other in an overlapping relationship, and then compression molding such layers to bond them together to form said molded article comprising said layers, the improvement, whereby disposing a heating element on an outer surface of said molded article, which comprises:
   printing a resistance heating circuit on a moldable plastic element;
   disposing said plastic element on an outermost layer in said moldable assembly of layers with said circuit disposed on a surface of said plastic element directed away from said outermost layer; and
   molding said assembly in manner such that said printed circuit is exposed on but does not substantially project from said molding.

* * * * *